J. FENN.
MODE OF SECURING SHOES TO HORSES' FEET.
No. 42,845.
PATENTED MAY 24, 1864.
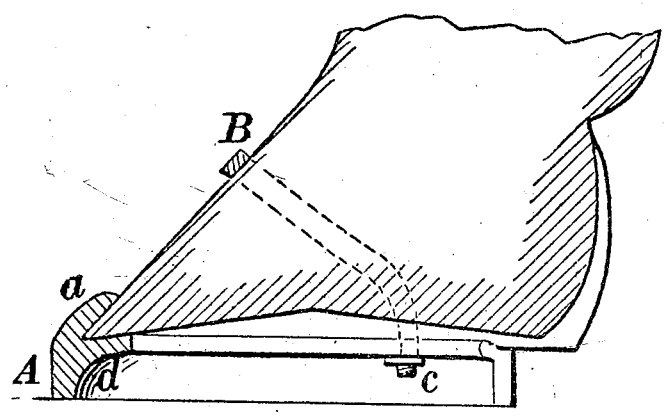
TAKEN FROM PATENT OFFICE REPORT
1864 VOL. II.
ONLY DRAWING ACCESSIBLE (1911)

UNITED STATES PATENT OFFICE.

JOEL FENN, OF PLAINVILLE, CONNECTICUT.

IMPROVED MODE OF SECURING SHOES TO HORSES' FEET.

Specification forming part of Letters Patent No. 42,845, dated May 24, 1864.

*To all whom it may concern:*

Be it known that I, JOEL FENN, of Plainville, in the county of Hartford and State of Connecticut, have invented a new and useful Improvement in Securing Shoes to the Feet or Hoofs of Horses; and I do hereby declare that the following is a full, clear, and exact description of the same, reference being had to the accompanying drawings, making a part of this specification, in which—

Figure 1 is a longitudinal vertical section of a shoe applied to the foot or hoof of a horse according to my invention; Fig. 2, a detached inverted plan of the same; Fig. 3, a longitudinal vertical section of the front part of a modification of the same.

Similar letters of reference indicate corresponding parts in the several figures.

This invention consists in securing the shoe to the foot or hoof by means of a metal strap attached to each side of the shoe and extending over the hoof, substantially as herein shown and described, whereby the use of nails is entirely avoided and the shoe rendered capable of being applied to and detached from the hoof with the greatest facility.

To enable those skilled in the art to fully understand and construct my invention, I will proceed to describe it.

A represents a horse shoe, which is of the usual shape, corresponding to that of the hoof, and is provided with an oblique or inclined flange, $a$, extending all around its upper edge at the outer side thereof. The shoe is also provided with a pendent flange, $b$, projecting down from its outer edge and extending all around it.

B represents a metal strap, the ends of which are attached to the sides of the shoe by a screw and nut at either or both ends. The ends of the strap E pass through holes in the shoe, and have screw-threads cut on them to receive nuts $c$ at the under side of the shoe. If only one end of the strap be provided with a screw and nut, the opposite end may have a head formed on it to prevent it from slipping through the shoe. The shoe—that is to say, the portion $d$ on which the hoof rests—has an inclined position, its back part being elevated or higher than its front part, as shown clearly in Fig. 1. This inclination at the toe of the shoe, in connection with the gradual contracted form of the shoe and hoof back of their centers, prevents the shoe from slipping forward or the hoof from being drawn backward out of the shoe. The flange $a$ bears snugly against the exterior of the hoof, and the strap B, which passes over the hoof, keeps the shoe snugly to the foot, said strap being drawn firmly on the hoof by screwing up the nut $c$ at one or both ends of the strap.

For shoes designed for use on pavements I intend to have two flanges, $b\ b$, with india-rubber, leather, or other suitable material interposed between, in order to avoid jars or concussions. (See Fig. 3.)

Having thus described my invention, what I claim as new, and desire to secure by Letters Patent, is—

A horseshoe provided with a flange, $a$, to fit snugly against the exterior of the hoof, in combination with the metallic strap B, and the front inclined portion of the part $d$, on which the hoof rests, all constructed and arranged substantially as and for the purpose herein set forth.

JOEL FENN.

Witnesses:
WM. H SMITH,
MERRITT BRONSON.